United States Patent
Chen et al.

(10) Patent No.: US 9,648,524 B2
(45) Date of Patent: May 9, 2017

(54) METHOD, NODE, AND SYSTEM FOR SELECTING TARGET CELL

(71) Applicant: Huawei Technologies Co., Ltd., Shenzhen (CN)

(72) Inventors: Dong Chen, Shanghai (CN); Xiaoying Xu, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 236 days.

(21) Appl. No.: 14/311,908

(22) Filed: Jun. 23, 2014

(65) Prior Publication Data
US 2014/0301368 A1 Oct. 9, 2014

Related U.S. Application Data

(63) Continuation of application No. PCT/CN2012/086859, filed on Dec. 18, 2012.

(30) Foreign Application Priority Data

Dec. 30, 2011 (CN) .......................... 2011 1 0456492

(51) Int. Cl.
H04W 36/00 (2009.01)
H04W 84/04 (2009.01)
(52) U.S. Cl.
CPC ... *H04W 36/0061* (2013.01); *H04W 36/0083* (2013.01); *H04W 84/045* (2013.01)
(58) Field of Classification Search
CPC ............. H04W 36/08; H04W 36/0055; H04W 36/0088; H04W 36/0094; H04W 84/045; H04W 36/0061; H04W 36/0083
(Continued)

(56) References Cited

U.S. PATENT DOCUMENTS

2009/0042574 A1* 2/2009 Jung ................. H04W 36/0061
455/436
2010/0330999 A1 12/2010 Larsson et al.
(Continued)

FOREIGN PATENT DOCUMENTS

| CN | 101583161 A | 11/2009 |
|---|---|---|
| CN | 101790216 A | 7/2010 |
| WO | 2011020382 A1 | 2/2011 |

OTHER PUBLICATIONS

International Search Report received in PCT/CN2012/086859, mailed Mar. 7, 2013, 12 pages.
(Continued)

*Primary Examiner* — Ricky Ngo
*Assistant Examiner* — Richard Chang
(74) *Attorney, Agent, or Firm* — Slater Matsil, LLP

(57) ABSTRACT

Embodiments of the present invention relate to the field of communications technologies, provide a method, node, and system for selecting a target cell, which are capable of selecting a candidate cell with signal quality meeting a predetermined standard as a target cell for a UE. The method of the present invention includes: transmitting a detection instruction to a candidate cell, where the detection instruction is used to instruct the candidate cell to detect uplink signal quality of a user equipment (UE); receiving a detection result transmitted by the candidate cell, and determining a target cell according to the detection result. The embodiments of the present invention are mainly implemented in a process of UE handover.

7 Claims, 8 Drawing Sheets

(58) Field of Classification Search
USPC .................................................. 370/328, 331
See application file for complete search history.

(56) References Cited

U.S. PATENT DOCUMENTS

2011/0305180 A1* 12/2011 Osterling .......... H04W 52/0206
370/311
2012/0135753 A1* 5/2012 Wang ................ H04W 52/0206
455/456.1

OTHER PUBLICATIONS

Huawei, et al., "Further Clarification on HNB-GW Disambiguation Based Solutions," 3GPP TSG-RAN WG3 #75bis, R3-120553, Mar. 26-30, 2012, 8 pages.
Qualcomm Europe, "Considerations on Enabling Active Hand-in for Legacy UEs," 3GPP TSG RAN WG3, R3-090842, Mar. 23-26, 2009, 4 pages.
Qualcomm Europe, "Network Support for Inbound Handover of Pre-Rel-9 UMTs UEs," 3GPP TSG-RAN WG3 #64, R3-091213, May 4-8, 2009, 4 pages.
Huawei, et al., "Analysis and Update on PSC Disambiguation for Legacy UEs," 3GPP TSG-RAN WG3 #76, R3-121000, May 21-25, 2012, 6 pages.

* cited by examiner

METHOD, NODE, AND SYSTEM FOR SELECTING TARGET CELL

This application is a continuation of International Application No. PCT/CN2012/086859, filed on Dec. 18, 2012, which claims priority to Chinese Patent Application No. 201110456492.1, filed on Dec. 30, 2011, both of which are hereby incorporated by reference in their entireties.

TECHNICAL FIELD

The present invention relates to the field of wireless communications, and in particular, to a method, node, and system for selecting a target cell.

BACKGROUND

The field of wireless communications faces pressure from explosive increase of data services. In order to improve network capacity and reduce transport cost, the industry proposes a heterogeneous network (Hetnet) technology. A Hetnet is composed of multiple cells of different sizes and types, including a macro cell and a micro-class cell. Micro-class cells include cells in forms such as a micro cell, a pico cell, a femto cell, and a remote radio head (RRH). Through deploying more micro-class cells for a traffic dense area, the network capacity of the area can be effectively improved; in addition, because of a relatively small scale of the micro-class cell, both the capital expenditure (Capax) and the operating expense (Opex) of the micro-class cell are relatively low, and therefore the Hetnet is valued by numerous operators, and is an important direction of wireless network evolution.

In the prior art, when a UE needs to be handed over from a macro cell to a micro-class cell, because a conventional user equipment (UE) does not have a capability of reading system information of a neighboring cell, and only can report a scrambling code of a target cell to a source node rather than reporting an identifier of the target cell. The number of micro-class neighboring cells of the macro cell is large, but the scrambling codes that are available to the micro-class cell are limited, therefore it is quite possible for multiple micro-class cells to reuse the same scrambling code (Primary Scrambling Code (PSC)).

Therefore, when a target node receives a scrambling code of a target cell, it is quite possible that the scrambling code corresponds to multiple micro-class cells, and the target cell cannot be determined. A source node compares the scrambling code with scrambling codes of all neighboring micro-class cells, and transmits a link establishment request message to one of micro-class cells that match the scrambling code, which may result in handover to a wrong cell, and it is difficult to ensure that a UE is successfully handed over to a target cell with relatively high signal quality.

SUMMARY

In multiple aspects, the present invention provides a method, node, and system for selecting a target cell, so as to select a target cell with relatively high signal quality for a UE.

In one aspect, the present invention provides a method for selecting a target cell, which is applied to a target node side and includes transmitting a detection instruction to a candidate cell, where the detection instruction is used to instruct the candidate cell to detect uplink signal quality of a user equipment (UE); and receiving a detection result transmitted by the candidate cell and determining an appropriate target cell according to the detection result.

In another aspect, the present invention provides a method for selecting a target cell, which is applied to a base station side and includes receiving a detection instruction transmitted by a target node; detecting uplink signal quality of a user equipment (UE) according to the detection instruction; and transmitting a detection result to the target node.

In another aspect, the present invention provides a method for selecting a target cell, which is applied to a source node side and includes transmitting a handover request message to a target node according to a measurement report reported by a UE, where the handover request message includes a detection instruction.

In another aspect, the present invention provides a target node, which includes a detection unit, configured to transmit a detection instruction to a candidate cell and receive a detection result transmitted by the candidate cell, where the detection instruction is used to instruct the candidate cell to detect uplink signal quality of a user equipment (UE); and a cell determining unit, configured to determine a target cell according to the detection result received by the detection unit.

In another aspect, the present invention provides a base station, which includes a receiving unit, configured to receive a detection instruction transmitted by a target node; an uplink detecting unit, configured to detect uplink signal quality of a user equipment (UE) according to the detection instruction; and a feedback unit, configured to transmit a detection result to the target node.

In another aspect, the present invention provides a source node, which includes a handover request unit, configured to transmit a handover request message to a target node according to a measurement report reported by a UE, where the handover request message includes a detection instruction.

In another aspect, the present invention provides a system for selecting a target cell, which includes a target node, a base station and a source node.

The source node is configured to transmit a handover request message to the target node according to a measurement report reported by a UE.

The target node is configured to transmit a detection instruction to a candidate cell and receive a detection result transmitted by the candidate cell, where the detection instruction is used to instruct the candidate cell to detect uplink signal quality of the user equipment (UE); and determine a target cell according to the detection result.

The base station is configured to receive the detection instruction transmitted by the target node, detect the uplink signal quality of the user equipment (UE) according to the detection instruction, and transmit the detection result to the target node.

In the method, node, and system for selecting a target cell described above, a candidate cell detects uplink signal quality of a UE to be handed over; according to a detection result, a candidate cell with signal quality meeting a predetermined standard is selected from candidate cells as a target cell. Compared with a method of randomly selecting one of candidate cells as a target cell in the prior art, improvement of a handover success rate can be ensured, and a target cell with relatively high signal quality can be selected for the UE.

BRIEF DESCRIPTION OF THE DRAWINGS

To describe the technical solutions in the embodiments of the present invention or in the prior art more clearly, the following briefly introduces accompanying drawings required for describing the embodiments. Apparently, the accompanying drawings in the following descriptions show merely some embodiments of the present invention, and persons of ordinary skill in the art may still derive other drawings from the accompanying drawings without creative efforts.

DETAILED DESCRIPTION OF ILLUSTRATIVE EMBODIMENTS

Figure 1:
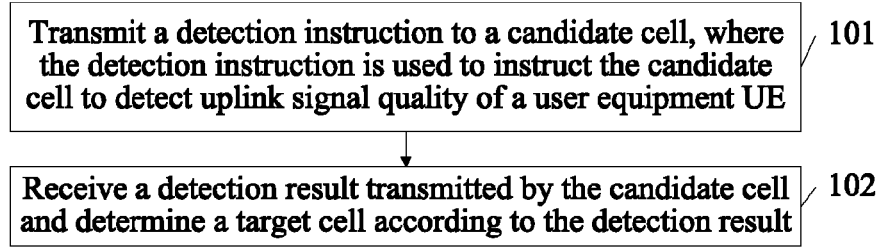
FIG. 1 is a flow chart of a method for selecting a target cell according to an embodiment of the present invention.

The following clearly and describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiment of the present invention without creative efforts shall fall within the protection scope of the present invention.

The technology described in this document is applicable to various communication systems, such as existing 2G and 3 G communication systems and a next generation communication system, such as a global system for mobile communications (GSM), a code division multiple access (CDMA) system, a time division multiple access (TDMA) system, wideband code division multiple access (WCDMA), a frequency division multiple addressing (FDMA) system, an orthogonal frequency-division multiple access (OFDMA) system, a single-carrier FDMA (SC-FDMA) system, a general packet radio service (GPRS) system, a long term evolution (LTE) system and other communication systems of this kind.

Various aspects are described in this document through a terminal and/or a base station and/or a base station node.

A user equipment may be a wireless terminal and may also be a wired terminal; the wireless terminal may refer to a device that provides voice and/or data connectivity for a user, a handheld device with a wireless connection function, or another processing device connected to a wireless modem. The wireless terminal may communicate with one or more core networks through a radio access network (RAN). The wireless terminal may be a mobile terminal, such as a mobile phone (or called a "cellular" phone) and a computer with a mobile terminal, and may be, for example, a portable, pocket-sized, handheld, computer built-in or vehicle mobile device that exchanges language and/or data with the radio access network. For example, the wireless terminal may be a device such as a personal communication service (PCS) phone, a cordless phone, a session initiation protocol (SIP) phone, a wireless local loop (WLL) station, and a personal digital assistant (PDA). The wireless terminal may also be called a system, a subscriber unit, a subscriber station, a mobile station, a mobile, a remote station, an access point, a remote terminal, an access terminal, a user terminal, a user agent, and a user equipment.

The base station (such as an access point) may refer to a device that communicates with a wireless terminal through one or more sectors on an air interface in an access network. The base station may be configured to convert a received air frame and an IP packet into each other, and serve as a router between a wireless terminal and the rest of the access network, where the rest of the access network may include an internet protocol (IP) network. The base station may also coordinate attribute management on the air interface. For example, the base station may be a base station in GSM or CDMA (BTS, Base Transceiver Station), may also be a base station in WCDMA (NodeB), and may further be an evolutional base station in LTE (NodeB or eNB or e-NodeB, evolutional Node B), which is not limited in the present invention.

A base station controller (a source node or a target node) may be a base station controller (BSC) in GSM or CDMA, and may also be a radio network controller (RNC) in WCDMA, which is not limited in the present invention.

Further, the terms "system" and "network" in this document can usually be exchanged for use in this document. The term "and/or" in this document is only an association relationship for describing associated objects, and indicates that three relationships may exist, for example, A and/or B may represent the following three cases: A exists alone, both A and B exist, and B exists alone. In addition, the character "/" in this document usually represents that the former and later associated objects are in a "or" relationship.

An embodiment of the present invention provides a method for selecting a target cell, which is applicable to a source node side, as shown in FIG. 1.

101: Transmit a detection instruction to a candidate cell, where the detection instruction is used to instruct the candidate cell to detect uplink signal quality of a user equipment UE.

The detection instruction may be transmitted through a dedicated detection message before a target node establishes a radio link with the candidate cell; and may also be transmitted through a first link establishment request message during a process in which a target node establishes a radio link with the candidate cell. The candidate cell may be composed of multiple cells, which may be multiple micro-class cells using the same frequency and the same scrambling code, may also be micro-class cells that use the same scrambling code and are all adjacent to a source cell, and may also be a cell set composed of multiple cells obtained in another manner. A division manner of candidate cells is not limited in the embodiment of the present invention.

102: Receive a detection result transmitted by the candidate cell and determine a target cell according to the detection result.

Specifically, through the detection result transmitted by the candidate cell, a cell with signal quality higher than a specified threshold, or a cell with signal quality that is higher than a certain threshold and returned the most quickly, or a cell with the highest signal quality may be selected from candidate cells as the target cell of handover of the UE. Definitely, the target cell may also be selected according to other predetermined standards. The predetermined standards are not limited in the embodiment of the present invention.

Figure 2:
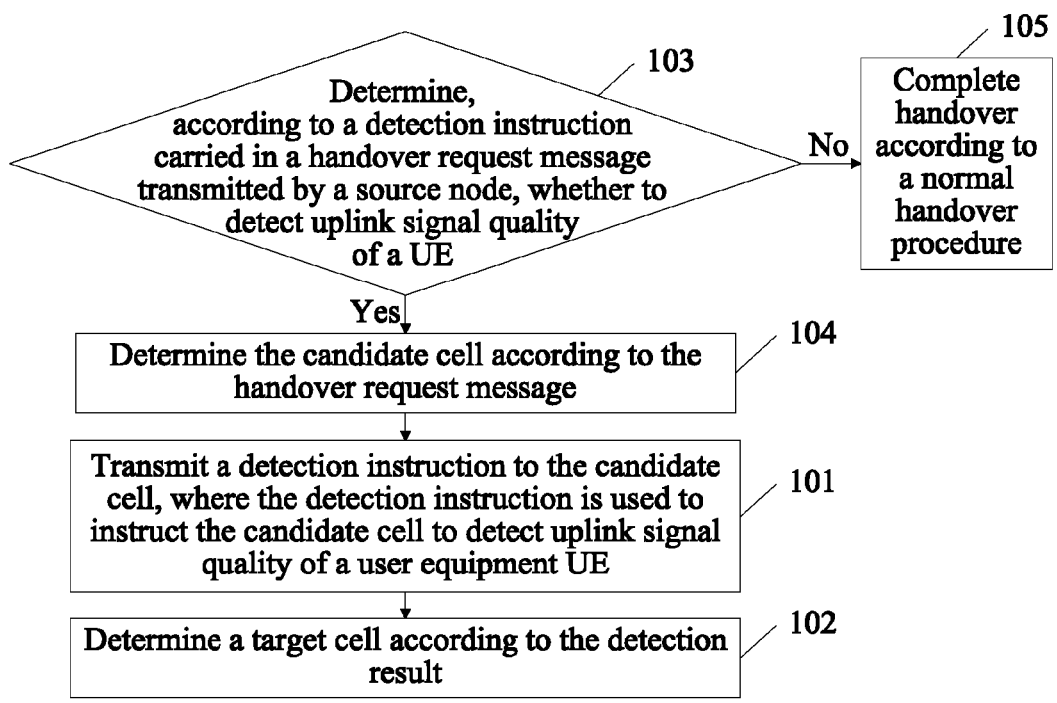
FIG. 2 is a flow chart of a method for selecting a target cell according to another embodiment of the present invention.

Further, as shown in FIG. 2, for compatibility with another existing handover mechanism, if a handover request message points to a definite target cell, a related operation of signal quality detection may not be performed, and handover is directly completed according to a normal procedure. Therefore, before step 101 is executed, the following may also be included.

103: Determine, according to a detection instruction carried in a handover request message transmitted by a source node, whether to detect the uplink signal quality of the UE; if the handover request message carries the detection instruction, execute step 104; if the handover request message does not carry the detection instruction, execute step 105.

The handover request message may be transmitted by the source node through a direct interface connected to the target node. Also, the handover request message may be transmitted by the source node to the core network, and then the core network forwards the handover request message to the target node. Because the handover request message transmitted by the source node to the target node may include the detection instruction, the target node may directly obtain the detection instruction from the handover request message. Alternatively, information content in the detection instruction may also be transmitted by the source node in another manner, and the target node obtains the information content to generate the detection instruction and transmits the detection instruction to the candidate cell.

According to whether the detection instruction exists, it may be determined whether it is required to make the candidate cell detect signal quality of the UE. When the detection instruction exists, it is required to determine the target cell according to the uplink signal quality of the UE; when the detection instruction does not exist, it is not required to perform uplink detection, and the handover is directly performed. In addition, whether to perform uplink detection may also be determined according to a detection request identifier in the detection instruction. For example, the detection request identifier may be a Boolean-type identifier. When the detection request identifier is 1, the target node may make the candidate cell detect the signal quality of the UE, and select an appropriate target cell according to a detection result; when the detection request identifier is 0, the target node may directly obtain a target cell identifier from the handover request message, and hand over the UE to a corresponding target cell. In addition, whether to perform uplink detection may also be determined through a scrambling code of the target cell carried in the detection instruction. For example, if the handover request message carries the scrambling code of the target cell, the target node may determine a candidate cell set according to the scrambling code of the target cell, and select the target cell after the signal quality of the candidate cell is detected. If the handover request message does not carry the scrambling code of the target cell, the handover may be directly completed according to an existing handover procedure. Alternatively, whether to perform uplink detection may also be determined through an identifier of a micro-class candidate cell set carried in the detection instruction, and the identifier of the micro-class candidate cell set is composed of a mapping value of a source cell identifier and a mapping value of the scrambling code of the target cell. It can be understood that, the form of the detection instruction for determining whether to perform uplink quality detection includes but is not limited to the foregoing forms, and may also be an identifier in another form, which is not described one by one in the embodiment of the present invention.

104: Determine the candidate cell according to the handover request message, and execute the transmitting the detection instruction to the candidate cell.

The target node may determine, according to the scrambling code of the target cell carried in the handover request message, candidate cells sharing the same scrambling code, and may also determine a candidate cell according to an identifier of a micro-class cell set carried in the handover request message. There may be multiple candidate cells, and when the detection instruction is transmitted, the detection instruction is transmitted to every cell among the multiple candidate cells.

Specifically, a method for determining the candidate cell may be: according to the handover request message transmitted by the source node, if the request message includes source cell information, determining that a cell adjacent to the source cell is the candidate cell. The method for determining the candidate cell may also be: if the request message includes scrambling code information of the target cell, determining that a cell matching the received scrambling code information is the candidate cell. The method may also be: if the request message includes scrambling code information of the target cell and source cell information, determining that a cell that is adjacent to the source cell and has the same scrambling code as the received scrambling code of the target cell is the candidate cell.

105: Complete the handover according to a normal handover procedure.

The normal handover procedure may be: obtaining the target cell identifier from the handover request message, and handing over the UE to the corresponding target cell; and may also be: obtaining the scrambling code of the target cell, transmitting a link establishment request to one of micro-class cells that correspond to the scrambling code of the target cell, and completing subsequent handover. It can be understood that, in the prior art, other handover procedures may also be used, which are not described one by one in the embodiment of the present invention.

In this embodiment, the detection instruction may include at least one piece of the following information: an uplink scrambling code of the UE, uplink frequency information of the UE, information of a frequency band on which an uplink frequency of the UE is located, configuration information of discontinuous transmission of the UE, intra-frame timing offset information of an uplink dedicated physical control channel of the UE, timeslot format information of the uplink dedicated physical control channel of the UE, the scrambling code of the target cell, an uplink measurement item of the UE, a detection duration, continuous detection time, a reporting threshold and so on. The information included in the detection instruction includes but is not limited to the information elements (IEs) described above.

Specifically, the information that may be included in the detection instruction and specific meanings of each piece of the information may be illustrated in Table 1.

TABLE 1

| IE name | Remark |
|---|---|
| Maximum detection duration | For example, 40, 60, 80, 100, 120, 140, 160 milliseconds |
| Uplink scrambling code of the UE | Use information of UL DPCH Information IE in the radio link request message in TS 25.433 |
| Minimum uplink channelization code length of the UE | |
| Maximum number of uplink DPDCH channels of the UE | |
| Punching limitation of the UE | |
| Uplink transport format combination set of the UE | |
| Timeslot format information of uplink and downlink DPCCHs of the UE | |

TABLE 1-continued

| IE name | Remark |
|---|---|
| | Uplink signal to interference ratio target value of the source cell |
| | Diversity mode of the UE |
| | Downlink power control mode of the source cell |
| | Uplink dedicated data channel instruction of the source cell for enhancing a DCH operation |
| | Chip offset of a starting point of a UE uplink DPCCH frame relative to a PCCPCH frame of the target cell |
| | Information of an uplink frequency point of the UE or a downlink frequency point of the source cell |
| | Indication information of a frequency band on which the uplink frequency point of the UE is located |
| | Configuration information of a discontinuous packet transmission mode of the UE |

The configuration information of the discontinuous packet transmission mode of the UE is used to configure detection on a UE that transmits packets discontinuously. For using a detection mode for a discontinuous packet transmission state when the UE is in the discontinuous packet transmission state, the configuration information of the discontinuous packet transmission mode of the UE may include one or more parameters in Table 2. In addition, before initiating handover, the source cell may notify the UE to stop the discontinuous packet transmission mode, so that the candidate cell is not required to detect the UE on the basis that the UE is in the discontinuous packet transmission mode.

TABLE 2

| UE DTX DRX Offset Enabling Delay | Starting position of discontinuous packet transmission Number of frames delayed in entering discontinuous transmission from continuous transmission |
|---|---|
| DTX Information | DTX information |
| CHOICE E-DCH TTI Length | CHOICE E-DCH TTI length |
| | If TTI is 2 milliseconds |
| UE DTX Cycle 1 | Number of sub-frames of one DTX cycle under an uplink UL DPCCH DTX mode 1 |
| UE DTX Cycle 2 | Number of sub-frames of one DTX cycle under an uplink UL DPCCH DTX mode 2 (used in a case where E-DCH has no uplink data transmitted) |
| MAC DTX Cycle | Cycle length for a MAC layer to transmit uplink E-DCH data |
| | If TTI is 10 milliseconds |
| UE DTX Cycle 1 | UE DTX Cycle 1 |
| UE DTX Cycle 2 | UE DTX Cycle 2 |
| MAC DTX Cycle | MAC DTX Cycle |
| Inactivity Threshold for UE DTX Cycle 2 | Define the number of E-DCH TTIs after which a CPC mode is switched from UE_DTX_cycle_1 to UE_DTX_cycle_2 |
| UE DTX Long Preamble | Define the number of preamble timeslots begin to be transmitted under the UE_DTX_cycle_2 mode (both UL DPCCH DTX and DL DRX use the value) |
| MAC Inactivity Threshold | Identify waiting time required for stating an E-DCH inactive state |
| CQI DTX Timer | Indicate the number of sub-frames after which a priority of uplink transmission of a CQI report is raised after data of HS-DPSCH is received, so that the CQI report needs to be transmitted even in an interval of DTX |
| UE DPCCH burst1 | Number of sub-frames required to be transmitted under the UE_DTX_cycle_1 mode (UE_DTX_cycle_1-UE_DPCCH_burst_1 is the number of sub-frames that are not transmitted) |
| UE DPCCH burst2 | Number of sub-frames required to be transmitted under the UE_DTX_cycle_2 mode (UE_DTX_cycle_1-UE_DPCCH_burst_1 is the number of sub-frames that are not transmitted) |

It should be noted that, in the embodiment of the present invention, the information included in the detection instruction that is transmitted to the candidate cell from the target node includes but is not limited to the foregoing form, and the corresponding content may be further increased or modified according to an actual situation, which is not limited in the embodiment of the present invention. In addition, the information content and form that are included in the detection instruction may be preconfigured on the target node, may also be transmitted to the target node by the source node through the handover request message, and may also be delivered to the target node by the core network. A specific configuration source of the detection instruction is not limited in the embodiment of the present invention either.

Figure 3:
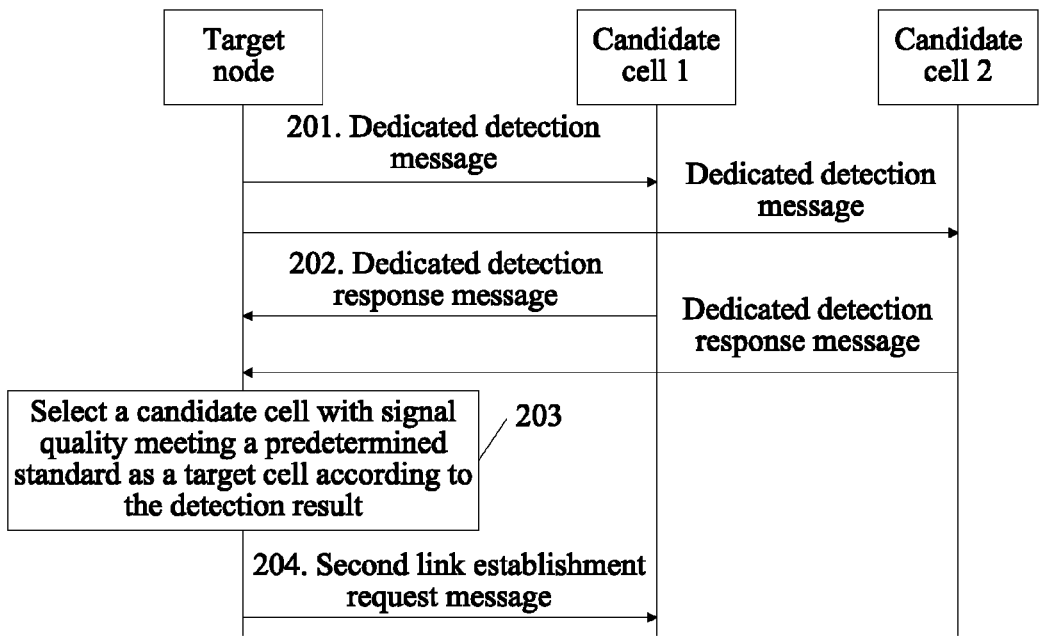
FIG. 3 is a flow chart of a method for selecting a target cell according to another embodiment of the present invention.

Another embodiment of the present invention provides a method for selecting a target cell, which is applicable to a target node side, as shown in FIG. 3. In an application scenario of the embodiment of the present invention, a detection instruction may be transmitted through a dedicated detection message, so that steps 101 to 102 may further be implemented in the following manner.

201: Transmit a dedicated detection message to the candidate cell, where the dedicated detection message carries the detection instruction.

Before the candidate cell is requested to prepare a radio link resource, the dedicated detection message carrying the detection instruction may be used first to instruct the candidate cell to detect uplink signal quality of a UE to be handed over.

202: Receive a dedicated detection response message transmitted by the candidate cell, where the dedicated detection response message includes the detection result.

The dedicated detection response message may be a detection successful response message including the detection result, and may also be a detection failure response message.

203: Select a candidate cell meeting a predetermined standard as the target cell according to the detection result.

The detection result may be an indication, and the indication indicates that the UE is detected. Further, the detection result may indicate that the uplink signal quality of the UE is higher than a certain threshold. The detection result may further include a specific measurement value.

The detection result includes at least one piece of the following information: an indication indicating that a predetermined threshold is exceeded, an indication indicating that the UE is detected, a specific measurement value of an uplink signal of the UE, a detection time length, and a time length of continuous detection.

If the target node receives detection results transmitted by multiple candidate cells, the target node may compare the multiple detection results and select a cell with signal quality meeting the predetermined standard as the target cell. If the target node receives a detection failure message transmitted by a certain candidate cell, the target node may directly give up the candidate cell whose detection is failed, and select the target cell from other candidate cells. The predetermined standard may be preset according to an actual situation. For example, the predetermined standard may be that signal quality is the highest, and the cell with the highest signal quality is selected from candidate cells as the target cell. Alternatively, if the target node does not receive a detection result of a certain candidate cell within predetermined time, the target node may also give up the candidate cell and select the target cell from other candidate cells. In addition, the predetermined standard may also be that the detection result is transmitted most quickly and uplink signal quality of the UE is higher than a certain threshold, and a candidate cell that transmits the detection result most quickly and has the uplink signal quality of the UE higher than the certain threshold is selected as the target cell. The reason is that detection of a cell nearest to the UE is generally the fastest. This manner can speed up a handover procedure.

In addition, a measurement item of signal quality, such as an uplink signal-to-noise ratio and uplink signal receiving, may be pre-agreed. Specially, if the target node receives a detection result of only one candidate cell, and detection of other candidate cells is failed or the other candidate cells all have no response, the target node may determine that the only candidate cell that feeds back the detection result is the target cell.

204: Transmit a second link establishment request message to the target cell, so that the target cell completes a subsequent handover procedure.

The second link establishment request message may be an existing radio link establishment request message, used to initiate handover to the target cell and instructing the target cell to prepare the radio link resource.

Figure 4:
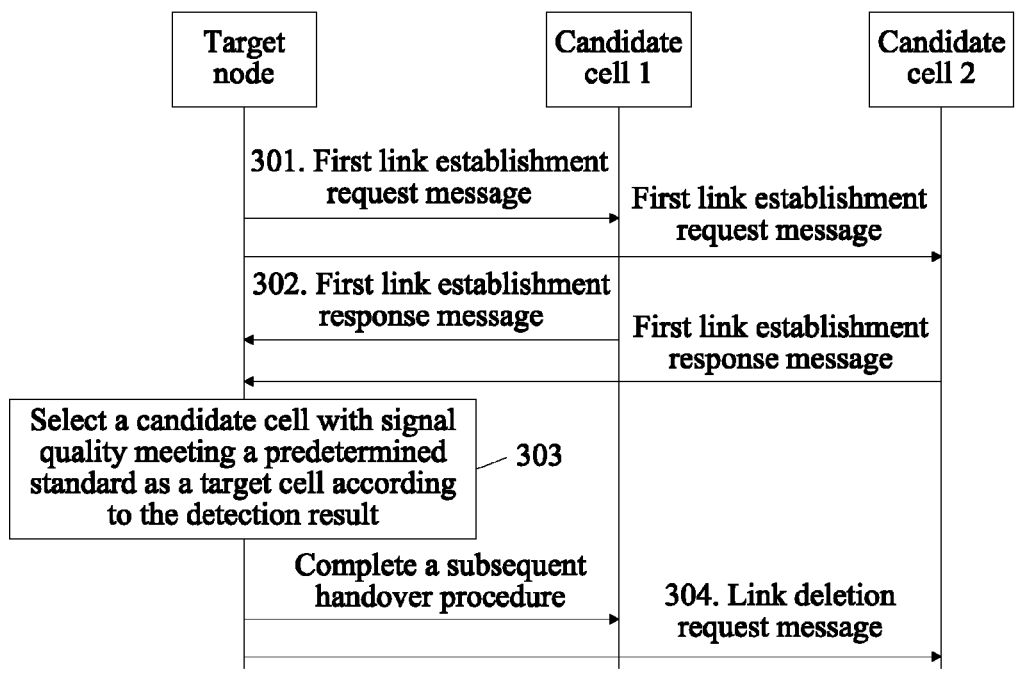
FIG. 4 is a flow chart of a method for selecting a target cell according to another embodiment of the present invention.

As shown in FIG. 4, in another implementation scenario of the embodiment of the present invention, a target node may also transmit a detection instruction to a candidate cell through a first link establishment request message, so that steps 101 to 102 may further be implemented in the following manner.

301: Transmit a first link establishment request message to the candidate cell, where the first link establishment request message carries the detection instruction.

The first link establishment request message is a radio link establishment request message carrying the detection instruction, which is obtained after the detection instruction is added to an existing radio link establishment request message. The first link establishment request message may initiate handover to the candidate cell and instruct the candidate cell to prepare a radio link resource, and at the same time, instruct the candidate cell to detect signal quality of a UE to be handed over.

302: Receive a first link establishment response message or a link establishment failure message that is transmitted by the candidate cell, where the first link establishment response message and the link establishment failure message include the detection result.

The detection result may be an indication, and the indication indicates that the UE is detected or the UE is not detected. Further, the detection result may further indicate that uplink signal quality of the UE is higher than a certain threshold. The detection result may further include a specific measurement value.

The first link establishment response message is a radio link establishment response message carrying the detection instruction, which is obtained after the detection instruction is added to an existing radio link establishment response message. The first link establishment response message is transmitted to the target node by the candidate cell, and may not only notify that the target node has already prepared the radio link resource, but also transmit the detection result to the target node. In addition, the link establishment failure message may indicate that the UE is not detected or the uplink signal quality of the UE is lower than the certain threshold.

303: Select a candidate cell meeting a predetermined standard as the target cell according to the detection result, and complete a subsequent handover procedure.

A method for selecting the target cell from candidate cells according to the detection result is the same as the method in step 203, and a measurement item of the detection and a predetermined standard for determining signal quality may be specified in advance.

304: Transmit a link deletion request message to a candidate cell other than the target cell.

In the embodiment of the present invention, the detection instruction is transmitted through the first link establishment request message, so that the candidate cell not only completes the detection procedure but also correspondingly prepares a resource required by the handover, such as an interface, a signaling point, and a bandwidth. Therefore, in order to prevent a waste of resources, after the target cell is determined, if the candidate cell other than the target cell has already prepared a radio link resource for the UE, the target node may transmit the link deletion request message to the candidate cell other than the target cell and notify the candidate cell, which has already prepared the radio link resource, of canceling the allocated radio link resource, so that the candidate cell releases the resource for another service to use.

Figure 5:
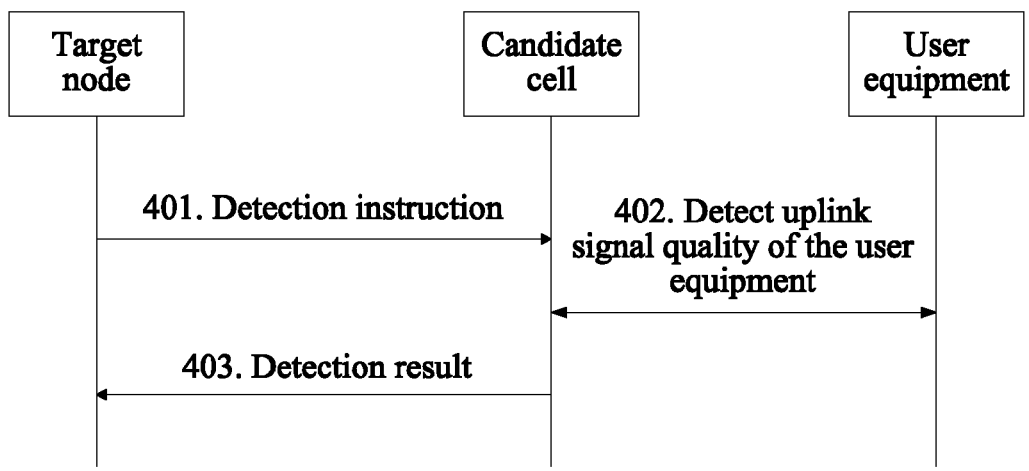
FIG. 5 is a flow chart of a method for selecting a target cell according to another embodiment of the present invention.

Another embodiment of the present invention further provides a method for selecting a target cell, which is applicable to a base station side, as shown in FIG. 5.

401: Receive a detection instruction transmitted by a target node.

The detection instruction includes at least one piece of the following information: an uplink scrambling code of a UE, uplink frequency information of the UE, information of a frequency band on which an uplink frequency of the UE is located, configuration information of discontinuous transmission of the UE, intra-frame timing offset information of an uplink dedicated physical control channel of the UE, timeslot format information of the uplink dedicated physical control channel of the UE, a scrambling code of the target cell, an uplink measurement item of the UE, a detection duration, continuous detection time, a reporting threshold, a detection request identifier, source cell information and so on. The information included in the detection instruction includes but is not limited to the foregoing content, and the content of the detection instruction may also be increased or modified according to an actual situation. The other instruction information that is not listed is the same as that in the first embodiment, which is not described again.

402: Detect uplink signal quality of the user equipment UE according to the detection instruction.

A candidate cell may detect a UE according to configuration information of the UE that is included in the detection instruction, such as a uplink scrambling code of the UE to be handed over, and may also calculate a starting position of an uplink signal frame of the UE according to uplink frequency information of the UE and intra-frame timing offset information, so that a detection signal is synchronized with an uplink signal of the UE. The candidate cell may also perform discontinuous transmission quality detection on the UE when the UE is in a discontinuous transmission state. By analogy, the candidate cell may further configure a detection parameter according to the other information in the detection instruction, and transmit a measurement result according to the measurement item indicated in the detection instruction.

403: Transmit a detection result to the target node.

The detection result may be included in a dedicated detection response message, and may also be included in a first link establishment response message to be transmitted to the target node, and may also be transmitted to the target node through a link establishment failure message or a detection failure message. The detection result may include one or more pieces of the following information: an indication indicating that the UE is detected/not detected, signal strength of an uplink DPCCH, a signal-to-noise ratio SIR of the uplink DPCCH, an indication indicating that a predetermined threshold is exceeded, and the detection duration. For the information included in the detection result, reference may be made to Table 3, and the information content in the detection result may also be increased or modified according to an actual situation, which is not limited in the embodiment of the present invention.

Another manner for showing the detection result is that: only an agreed dedicated response message is transmitted, this message may not include any of the forgoing detection results, and as long as the target node receives the agreed dedicated response message, the target node determines that it is detected that the uplink signal quality of the UE exceeds a certain threshold.

TABLE 3

| Cell name | Cell type and reference |
| --- | --- |
| Uplink detection result | Detected/not detected |
| Signal strength of the uplink DPCCH | |
| Signal-to-noise ratio of the uplink DPCCH | |
| Indication indicating that a predetermined threshold is exceeded | |
| Length of detection time | |

Figure 6:
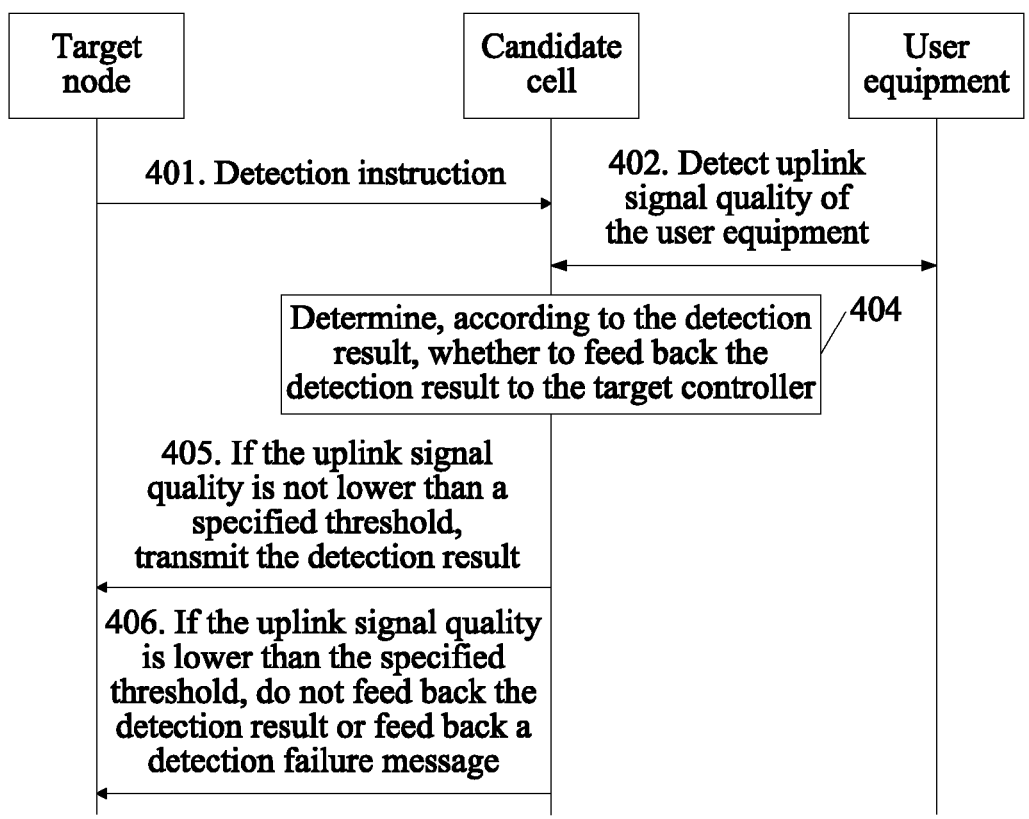
FIG. 6 is a flow chart of a method for selecting a target cell according to another embodiment of the present invention.

Further, as shown in FIG. 6, before the transmitting the detection result to the target node, the method for selecting a target cell may further include:

404: Determine, according to the detection result, whether to transmit the detection result to the target node; if the detection result indicates that uplink signal quality of the UE is not lower than a specified threshold, execute step 405; if the detection result indicates that the uplink signal quality of the UE is lower than a specified threshold, execute step 406.

After receiving the detection instruction transmitted by the target node, the candidate cell detects, according to the information in the detection instruction and a configuration parameter, uplink signal quality of the UE to be handed over. The candidate cell may determine, according to the detection result, whether to feed back the detection result to the target node, and if the uplink signal quality of the UE is not lower than the specified threshold, the detection result is transmitted to the target node; if the uplink signal quality of the UE is lower than the specified threshold, the detection result may not be transmitted to the target node, or a detection failure result is transmitted to the target node, so as to reduce a calculation amount of the target node.

405: Transmit the detection result to the target node.

In different application scenarios, the candidate cell may transmit the detection result to the target node through different message forms. For example, if the target node transmits the detection instruction through a dedicated detection message, the candidate cell carries the detection result in a dedicated detection response message and transmits the dedicated detection response message to the target node. If the target node transmits the detection instruction through a first link establishment request message, the candidate cell carries the detection result in a first link establishment response message and transmits the first link establishment response message to the target node.

Another manner for indicating the detection result is that: only the first link establishment response message is transmitted, this message may not include any of the forgoing detection results, and as long as the target node receives the first link establishment response message, the target node determines that it is detected that the uplink signal quality of the UE exceeds a certain threshold.

406: Do not transmit the detection result to the target node, or transmit a detection failure message to the target node.

If the candidate cell does not detect the UE to be handed over, or UE signal quality obtained from the detection is relatively poor, the detection result may not be transmitted to the target node, or the detection failure message may be transmitted to the target node, or a link establishment failure message is transmitted to the target node. The link establishment failure message and the detection failure message may also include the detection result.

For example, the candidate cell detects the UE according to related configuration information of the UE that is included in the detection instruction; however, if a signal of the UE is still not detected within a maximum detection duration, the detection failure message or a link establishment failure message may be transmitted to the target node. Alternatively, if the candidate cell detects the uplink signal quality of the UE and then finds that the signal quality is lower than a predetermined standard and cannot guarantee desirable service, the detection result may not be transmitted to the target node; after receiving the detection result, the target node may automatically give up the candidate cell.

Figure 7:
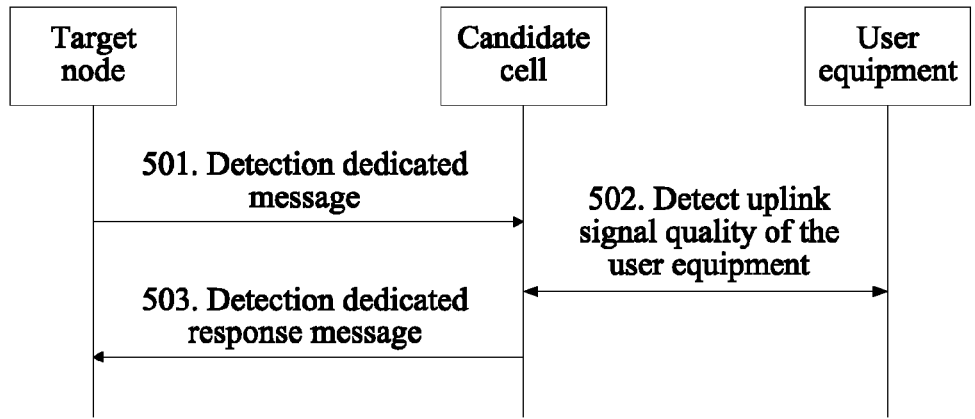
FIG. 7 is a flow chart of a method for selecting a target cell according to another embodiment of the present invention.

Another embodiment of the present invention provides a method for selecting a target cell, which is applicable to a base station side, as shown in FIG. 7. In an application scenario of the embodiment of the present invention, a detection result may be transmitted to a target node through a dedicated detection response message, so that steps 401 to 403 may also be implemented in the following manner.

501: Receive a dedicated detection message transmitted by the target node, where the dedicated detection message carries the detection instruction.

A candidate cell receives the dedicated detection message transmitted by the target node, obtains the detection instruction by parsing the dedicated detection message, and uses related configuration information included in the detection instruction to detect a UE to be handed over.

502: Detect the uplink signal quality of the user equipment UE according to the detection instruction.

503: Transmit a dedicated detection response message to the target node, where the dedicated detection response message includes the detection result.

After detecting the uplink signal quality of the UE according to the information in the detection instruction, the candidate cell carries a measurement result in the dedicated detection response message, and transmits the dedicated detection response message to the target node. The information of the measurement result may be one or more pieces of information in Table 3. A measurement item of the UE that is included in the detection result may be pre-agreed by the target node and the candidate cell, and may also be determined through the detection instruction, for example, the measurement item may be a signal-to-noise ratio of a UE uplink signal, which is not limited in the embodiment of the present invention.

Figure 8:
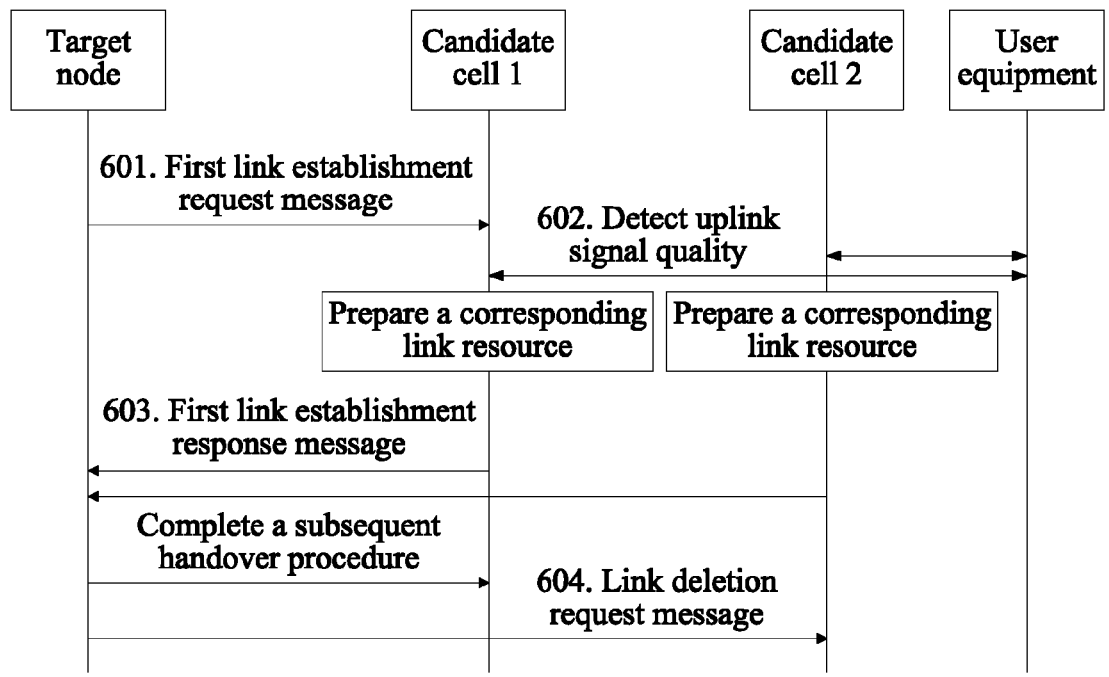
FIG. 8 is a flow chart of a method for selecting a target cell according to another embodiment of the present invention.

As shown in FIG. 8, in another implementation scenario of the embodiment of the present invention, a base station may also transmit a detection result to a target node through a first link establishment response message, so that steps 401 to 403 may further be implemented in the following manner.

601: Receive a first link establishment request message transmitted by the target node, where the first link establishment request message carries the detection instruction.

The first link establishment request message is transmitted to a candidate cell by the target node, and is a radio link establishment request message carrying the detection instruction, which is obtained after the detection instruction is added to an existing radio link establishment request message. After receiving the first link establishment request message, the candidate cell not only prepares a corresponding radio link resource, but also detects uplink signal quality of a UE to be handed over. The candidate cell may prepare the radio link resource for the UE only after it is detected that uplink signal quality of the UE is higher than a certain threshold.

602: Detect the uplink signal quality of the user equipment UE according to the detection instruction.

603: Prepare the radio link resource and transmit a first link establishment response message to the target node, where the first link establishment response message includes the detection result.

The first link establishment response message is transmitted to the target node by the candidate cell, and is a radio link establishment response message carrying the detection result, which is obtained after the detection result is added to an existing radio link establishment response message. The first link establishment response message is transmitted to the target node by the candidate cell, and may not only notify the target node that a related resource required by the handover is already prepared, but also transmit the detection result to the target node.

604: Delete the prepared radio link resource according to a link deletion request message transmitted by the target node.

For example, there are two candidate cells in one handover, which are candidate cell 1 and candidate cell 2, and if the target node finds that signal quality of candidate cell 1 is higher according to the detection result, candidate cell 1 is determined as the target cell, and candidate cell 1 completes subsequent handover work. If candidate cell 2 has already allocated a radio link resource for this handover, the target node may transmit a link deletion request message to candidate cell 2; after receiving the link deletion request message, candidate cell 2 deletes the prepared radio link resource and releases the sources for other services to use.

Figure 9:
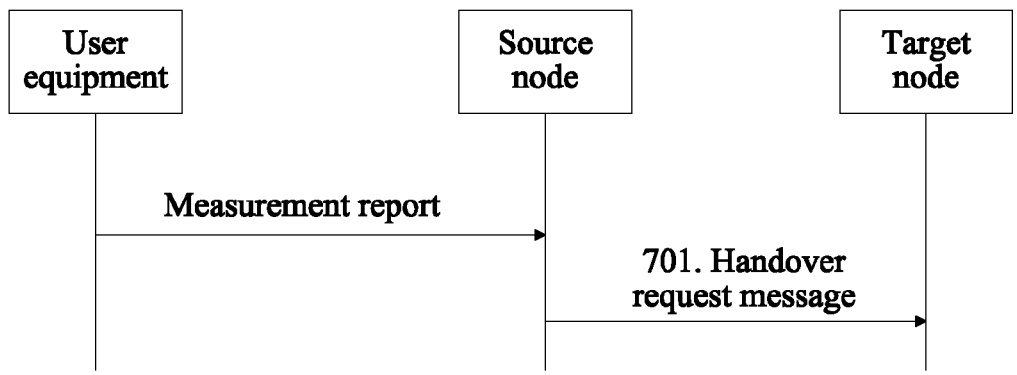
FIG. 9 is a flow chart of a method for selecting a target cell according to another embodiment of the present invention.

Another embodiment of the present invention provides a method for selecting a target cell, which is applicable to a source node side, as shown in FIG. 9.

701: Transmit a handover request message to a target node according to a measurement report reported by a UE, where the handover request message includes a detection instruction.

In the embodiment of the present invention, when the target node cannot determine a unique target cell, multiple candidate cells may be made to detect signal quality of a UE so as to select a target cell with desirable signal quality, so that a detection instruction transmitted to the candidate cells by the target node includes configuration information related to detection. The configuration information can not only be preconfigured on the target node, but also be obtained from a source node.

The source node is a controller of a serving cell in which a UE to be handed over is located, and is capable of obtaining an uplink scrambling code of the UE, a scrambling code of the target cell, and related configuration information of the UE. A source node may transmit the configuration information to the target node through a handover request message, or through a dedicated configuration information delivery message, or through a system message. The target node may generate the detection instruction according to the received related configuration information, and transmit the detection instruction to a candidate cell. Further, the handover request message may further include a detection request identifier. The detection request identifier is used to instruct the target node to perform uplink signal quality detection on the UE.

The detection request identifier may be added to the handover request message, and is used to indicate whether the target node is required to determine the target cell by detecting signal quality of the UE. The detection request identifier may be a Boolean-type information element, or a target cell identifier, or the scrambling code of the target cell or the like. Whether it is required to determine the target cell by detecting the signal quality of the UE may also be determined according to whether the detection request identifier exists. When the detection request identifier exists, it is required; when the detection request identifier does not exit, it is not required. For example, if a measurement report transmitted by the UE to the source node includes a definite target cell identifier, the source node may carry the target cell identifier in the handover request message and transmit the handover request message to the target node, so that the target node may directly complete the handover according to a normal procedure without detecting signal quality of the candidate cell.

Figure 10:
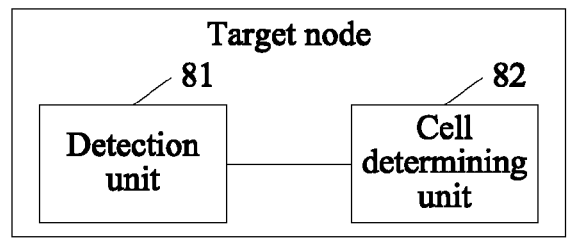
FIG. 10 is a schematic composition diagram of a target node according to another embodiment of the present invention.

Another embodiment of the present invention provides a target node, which, as shown in FIG. 10, includes a detection unit 81 and a cell determining unit 82.

The detection unit 81 is configured to transmit a detection instruction to a candidate cell and receive a detection result transmitted by the candidate cell, where the detection instruction is used to instruct the candidate cell to detect uplink signal quality of a user equipment UE.

The cell determining unit 82 is configured to determine a target cell according to the detection result received by the detection unit 81.

Figure 11:
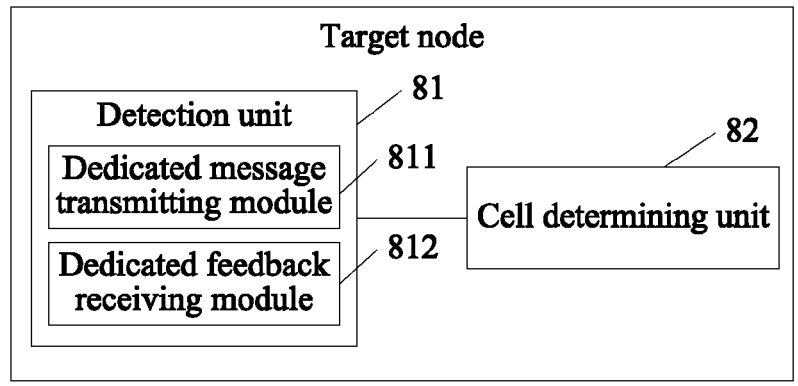
FIG. 11 is a schematic composition diagram of a target node according to another embodiment of the present invention.

Further, as shown in FIG. 11, the detection unit 81 may include a dedicated message transmitting module 811 and a dedicated feedback receiving module 812.

The dedicated message transmitting module 811 is configured to transmit a dedicated detection message to the candidate cell, where the dedicated detection message carries the detection instruction.

The dedicated feedback receiving module 812 is configured to receive a dedicated detection response message transmitted by the candidate cell, where the dedicated detection response message includes the detection result.

Figure 12:
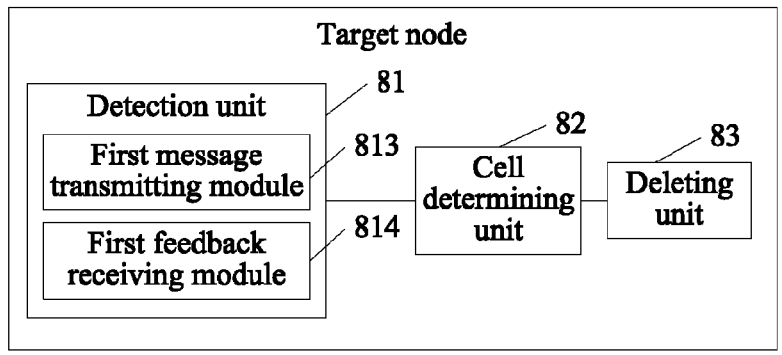
FIG. 12 is a schematic composition diagram of a target node according to another embodiment of the present invention.

As shown in FIG. 12, in another implementation scenario of the embodiment of the present invention, the detection unit 81 may further include a first message transmitting module 813 and a first feedback receiving module 814.

The first message transmitting module 813 is configured to transmit a first link establishment request message to the candidate cell, where the first link establishment request message carries the detection instruction.

The first feedback receiving module 814 is configured to receive a first link establishment response message transmitted by the candidate cell, where the first link establishment response message includes the detection result.

Optionally, the cell determining unit 82 may further be configured to select, according to the detection result, a candidate cell, which has signal quality exceeding a predetermined threshold and responds most quickly, as the target cell. Alternatively, the cell determining unit 82 is further configured to select, according to the detection result, a candidate cell with the highest signal quality as the target cell.

Further, in the implementation scenario illustrated in FIG. 12, the target node may further include a deleting unit 83.

The deleting unit 83 is configured to transmit a link deletion request message to a candidate cell other than the target cell, the candidate cell having already prepared a radio link resource for the UE, so that the candidate cell other than the target cell releases the radio link resource prepared for the UE.

Figure 13:
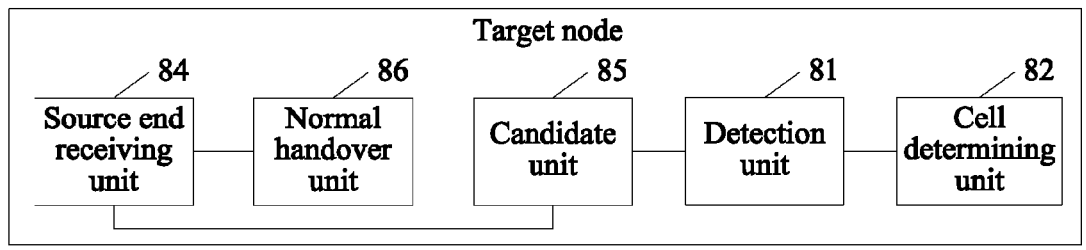
FIG. 13 is a schematic composition diagram of a target node according to another embodiment of the present invention.

Further, as shown in FIG. 13, the target node may further include a source end receiving unit 84, a candidate unit 85, and a normal handover unit 86.

The source end receiving unit 84 is configured to: before the detection unit 81 transmits the detection instruction to the candidate cell and receives the detection result transmitted by the candidate cell, according to a detection identifier carried in a handover request message transmitted by a source node, determine whether to detect the uplink signal quality of the UE.

The candidate unit 85 is configured to: when the source end receiving unit 84 determines that the handover request message carries the detection identifier, determine the candidate cell according to the handover request message.

The detection unit 81 is further configured to: after the candidate unit 85 determines the candidate cell, transmit the detection instruction to the candidate cell.

The normal handover unit 86 is configured to: when the source end receiving unit 84 determines that the handover request message does not carry the detection identifier, complete handover according to a normal handover procedure.

It should be noted that, the detection instruction includes at least one piece of the following information: an uplink scrambling code of the UE, uplink frequency information of the UE, information of a frequency band on which an uplink frequency of the UE is located, configuration information of discontinuous transmission of the UE, intra-frame timing offset information of an uplink dedicated physical control channel of the UE, timeslot format information of the uplink dedicated physical control channel of the UE, a scrambling code of the target cell, an uplink measurement item of the UE, a detection duration, continuous detection time, a reporting threshold, a detection request identifier, and source cell information.

Figure 14:
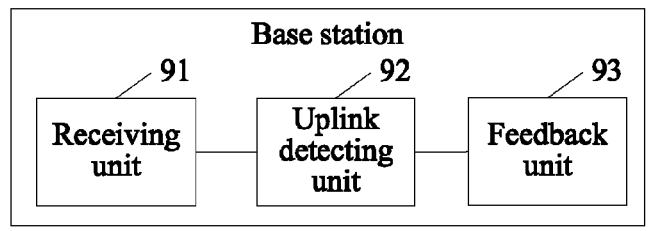
FIG. 14 is a schematic composition diagram of a base station according to another embodiment of the present invention.

Another embodiment of the present invention further provides a base station, which, as shown in FIG. 14, includes a receiving unit 91, an uplink detecting unit 92, and a feedback unit 93.

The receiving unit 91 is configured to receive a detection instruction transmitted by a target node.

The uplink detecting unit 92 is configured to detect uplink signal quality of a user equipment UE according to the detection instruction.

The feedback unit 93 is configured to transmit a detection result to the target node.

Figure 15:
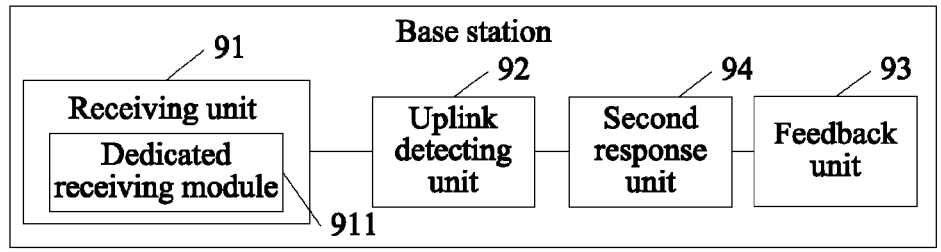
FIG. 15 is a schematic composition diagram of a base station according to another embodiment of the present invention.

Further, as shown in FIG. 15, the receiving unit 91 further includes a dedicated receiving module 911.

The dedicated receiving module 911 is configured to receive a dedicated detection message transmitted by the target node, where the dedicated detection message carries the detection instruction.

The feedback unit 93 is further configured to transmit a dedicated detection response message to the target node, where the dedicated detection response message includes the detection result.

Further, the base station may further include a second response unit 94.

The second response unit 94 is configured to: before the feedback unit 93 transmits the detection result to the target node, determine whether the uplink signal quality of the UE is lower than a specified threshold.

The feedback unit 93 is further configured to: when the uplink signal quality of the UE is not lower than the specified threshold, execute the transmitting the dedicated detection response message to the target node.

The feedback unit 93 is further configured to: when the uplink signal quality of the UE is lower than the specified threshold, transmit no detection response to the target node or transmit a detection failure message to the target node.

Figure 16:
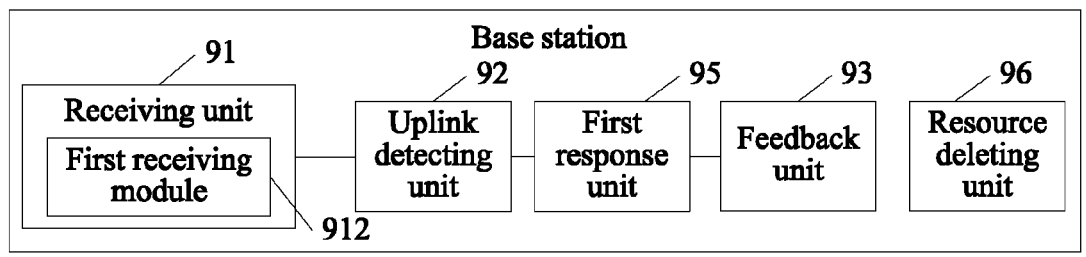
FIG. 16 is a schematic composition diagram of a base station according to another embodiment of the present invention.

As shown in FIG. 16, in another implementation scenario of the embodiment of the present invention, the receiving unit 91 includes a first receiving module 912.

The first receiving module 912 is configured to receive a first link establishment request message transmitted by the target node, where the first link establishment request message carries the detection instruction.

The feedback unit 93 is further configured to prepare a corresponding radio link resource and transmit a first link establishment response message to the target node, where the first link establishment response message includes the detection result.

Further, the base station may further include a first response unit 95.

The first response unit 95 is configured to: before the feedback unit 93 transmits the detection result to the target node, determine, according to the detection result, whether to transmit the detection result to the target node.

The feedback unit 93 is further configured to: when the uplink signal quality of the UE is not lower than the specified threshold, execute the preparing the radio link resource and transmitting the first link establishment response message to the target node.

The feedback unit 93 is further configured to: when the uplink signal quality of the UE is lower than the specified threshold, transmit no first link establishment response message to the target node or transmit a link establishment failure message to the target node.

Further, the base station may further include a resource deleting unit 96.

The resource deleting unit 96 is configured to: after the feedback unit 93 transmits the detection result to the target node, if a link deletion request message transmitted by the target node is received, delete the prepared radio link resource.

The detection instruction includes at least one piece of the following information: an uplink scrambling code of the UE, uplink frequency information of the UE, information of a frequency band on which an uplink frequency of the UE is located, configuration information of discontinuous transmission of the UE, intra-frame timing offset information of an uplink dedicated physical control channel of the UE, timeslot format information of the uplink dedicated physical control channel of the UE, a scrambling code of the target cell, an uplink measurement item of the UE, a detection duration, continuous detection time, a reporting threshold, and a detection request identifier.

Figure 17:
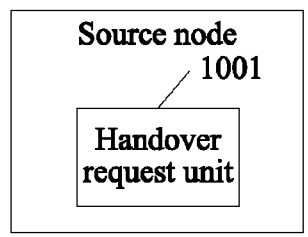
FIG. 17 is a schematic composition diagram of a source node according to another embodiment of the present invention.

Another embodiment of the present invention further provides a source node, which, as shown in FIG. 17, includes a handover request unit 1001.

The handover request unit 1001 is configured to transmit a handover request message to a target node according to a measurement report reported by a UE, where the handover request message includes a detection instruction.

The detection instruction includes at least one piece of the following information: an uplink scrambling code of a UE, uplink frequency information of the UE, information of a frequency band on which an uplink frequency of the UE is located, configuration information of discontinuous transmission of the UE, intra-frame timing offset information of an uplink dedicated physical control channel of the UE, timeslot format information of the uplink dedicated physical control channel of the UE, a scrambling code of the target cell, an uplink measurement item of the UE, a detection duration, continuous detection time, a reporting threshold, and a detection request identifier. The handover request message may further include a detection request identifier. The detection request identifier is used to instruct the target node to perform uplink signal quality detection on the UE.

Figure 18:
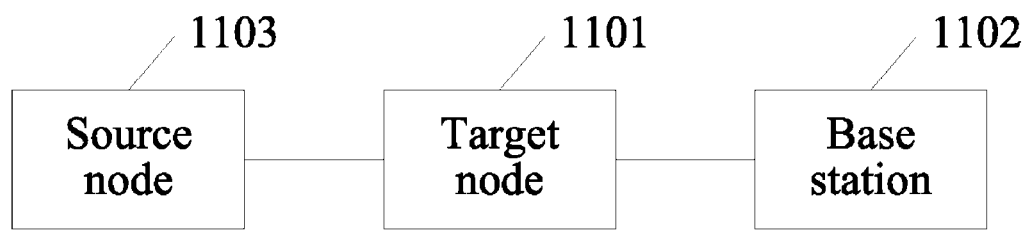
FIG. 18 is a schematic composition diagram of a system for selecting a target cell according to another embodiment of the present invention.

Another embodiment of the present invention further provides a system for selecting a target cell, which, as shown in FIG. 18, includes a target node 1101, a base station 1102, and a source node 1103.

The source node 1103 is configured to transmit a handover request message to the target node 1101 according to a measurement report reported by a UE.

The target node 1101 is configured to transmit a detection instruction to a candidate cell and receive a detection result transmitted by the candidate cell, where the detection instruction is used to instruct the candidate cell to detect uplink signal quality of the user equipment UE; and determine a target cell according to the detection result.

The base station 1102 is configured to receive the detection instruction transmitted by the target node 1101, detect the uplink signal quality of the user equipment UE according to the detection instruction, and transmit the detection result to the target node 1101.

In the target node, the source node, the base station, and the system for selecting a target cell provided by the embodiments of the present invention, a candidate cell detects uplink signal quality of a UE to be handed over; according to a detection result, a candidate cell with signal quality meeting a predetermined standard is selected from candidate cells as a target cell. Compared with a method of randomly selecting one of candidate cells as a target cell in the prior art, improvement of a handover success rate can be ensured, and a target cell with relatively high signal quality can be selected for a UE.

In addition, the present invention determines a target cell mainly by detecting uplink quality of a UE, and may also be applicable to other scenarios similar to a handover scenario.

Persons skilled in the art can clearly understand that, for the purpose of convenient and brief description, division of the foregoing function modules is taken as an example for illustration, in actual application, the foregoing functions can be allocated to and fulfilled by different modules as required, that is, an inner structure of the apparatus is divided into different function modules to fulfilled all or part of the functions described above. For a detailed working process of the foregoing system, apparatus and unit, reference may be made to the corresponding process in the method embodiments, and the details will not be described herein again.

In the several embodiments provided in the present application, it should be understood that the disclosed system, apparatus, and method may be implemented in other manners. For example, the described apparatus embodiment is merely exemplary. For example, the division of the modules or units is merely logical function division and may be other division in actual implementation. For example, a plurality of units or components may be combined or integrated into another system, or some features may be ignored or not executed. In addition, the displayed or discussed mutual coupling or direct coupling or communication connection may be implemented through some interfaces. The indirect coupling or communication connection between the apparatuses or units may be implemented in electronic, mechanical or other forms.

The units described as separate parts may or may not be physically separate, and parts displayed as units may or may not be physical units, may be located in one position, or may be distributed on a plurality of network units. A part or all of the units may be selected according to the actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit are implemented in the form of a software functional unit and sold or used as an independent product, the integrated unit may be stored in a computer-readable storage medium. Based on such understanding, the technical solutions of the present invention essentially, or the part contributing to the prior art, or all or a part of the technical solutions may be implemented in a form of a software product. The computer software product is stored in a storage medium and includes several instructions for instructing a computer device (which may be a personal computer, a server, or a network device) or a processor (processor) to execute all or a part of steps of the methods described in the embodiments of the present invention. The foregoing storage medium includes: various media that can store program codes, such as a USB flash disk, a removable hard disk, a read-only memory (ROM), a random access memory (RAM), a magnetic disk, or an optical disk.

Based on the above, the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the embodiments, or make equivalent replacements to some technical features in the technical solutions thereof; such modifications or replacements do not make the essence of corresponding technical solutions depart from the scope of the technical solutions of the embodiments of the present invention.

What is claimed is:

1. A method for selecting a target cell, comprising:
   receiving a handover request message transmitted by a source node;
   in response to the handover request message comprising an instruction to perform a detection, transmitting a dedicated detection message to each of a plurality of candidate cells, wherein the dedicated detection message carries a detection instruction, and wherein the detection instruction is used to instruct the plurality of candidate cells to detect uplink signal quality of a user equipment (UE), and wherein the plurality of candidate cells, upon receiving the detection instruction, each respectively detects the uplink signal quality of the UE, determines, according to a detection result, whether to transmit the detection result to a target node; and
   receiving a plurality of dedicated detection response messages, a dedicated detection response message of the plurality of dedicated detection response messages being transmitted by each of the plurality of candidate cells when the uplink signal quality of the UE is not lower than a specified threshold, wherein each of the plurality of dedicated detection response messages carries the detection result; and
   determining the target cell according to the detection results.

2. The method for selecting the target cell according to claim 1, wherein the determining the target cell according to the detection results comprises:
   selecting the candidate cell with a highest signal quality as the target cell according to the detection results; or
   selecting the candidate cell with signal quality exceeding a predetermined threshold as the target cell according to the detection results.

3. A method for selecting a target cell, comprising:
   receiving a dedicated detection message transmitted by a target node, wherein the dedicated detection message carries a detection instruction;
   detecting uplink signal quality of a user equipment (UE) according to the detection instruction;
   determining, according to a detection result, whether to transmit the detection result to the target node; and
   in response to the uplink signal quality of the UE being above a predetermined threshold, transmitting a dedicated detection response message to the target node, wherein the dedicated detection response message comprises the detection result.

4. The method for selecting the target cell according to claim 3, wherein the detection instruction comprises at least one piece of the following information: an uplink scrambling code of the UE, uplink frequency information of the UE, information of a frequency band on which an uplink frequency of the UE is located, configuration information of discontinuous transmission of the UE, intra-frame timing offset information of an uplink dedicated physical control channel of the UE, timeslot format information of the uplink dedicated physical control channel of the UE, a scrambling code of the target cell, an uplink measurement item of the UE, a detection duration, continuous detection time, a reporting threshold, a detection request identifier, and source cell information.

5. A target node, comprising:
   a receiver, configured to receive a handover request message transmitted by a source node;
   a processor; and
   a computer-readable storage medium storing a program to be executed by the processor, the program including instructions for:
   in response to the handover request message comprising an instruction to perform a detection, transmitting a first link establishment request message to a plurality of candidate cells, wherein the first link establishment request message carries a detection instruction, and wherein the detection instruction is used to instruct the respective candidate cell to detect uplink signal quality of a user equipment (UE), and wherein the plurality of candidate cells, upon receiving the detection instruction, respectively detect the uplink signal quality of the UE and, according to a detection result, determine whether to transmit the detection result to the target node; and receiving a plurality of first link establishment response messages, a first link establishment response of the plurality of first link establishment response messages being transmitted by each of the plurality of candidate cells when the uplink signal quality of the UE is not lower than a specified threshold, wherein the plurality of first link establishment response messages each comprise the detection result; and determining a target cell according to the detection results.

6. The target node according to claim 5, wherein the program further includes instructions for selecting the candidate cell with a highest signal quality as the target cell according to the detection results, or select the candidate cell with signal quality exceeding a predetermined threshold as the target cell according to the detection result.

7. A base station, comprising:
a receiver, configured to receive a first link establishment request message transmitted by a target node, wherein the first link establishment request message carries a detection instruction;
a processor; and
a computer-readable storage medium storing a program to be executed by the processor, the program including instructions for:
  detecting uplink signal quality of a user equipment (UE) according to the detection instruction;
  determining, according to a detection result, whether to transmit the detection result to the target node; and
  in response to the uplink signal quality of the UE being above a predetermined threshold, preparing a radio link resource and transmitting a first link establishment response message to the target node, wherein the first link establishment response message comprises a detection result.

* * * * *